United States Patent [19]

Mouché et al.

[11] Patent Number: 4,735,787

[45] Date of Patent: Apr. 5, 1988

[54] SCALE INHIBITOR FOR INTERMITTENT WASHED MIST ELIMINATORS IN FLUE GAS DESULFURIZATION SYSTEMS

[75] Inventors: Richard J. Mouché, Batavia; Mei-Jan L. Lin, Naperville, both of Ill.; Roy A. Johnson, Oconomowoc, Wis.

[73] Assignee: NALCO Chemical Company, Naperville, Ill.

[21] Appl. No.: 85,920

[22] Filed: Aug. 17, 1987

[51] Int. Cl.$^4$ .............................................. C01B 17/00
[52] U.S. Cl. ................................ 423/242; 106/14.21; 106/14.39; 203/7; 252/175; 252/181; 423/555
[58] Field of Search ................... 252/175, 181; 203/7; 423/242, 555; 106/14.21, 14.39

[56] References Cited

U.S. PATENT DOCUMENTS

| | | | |
|---|---|---|---|
| 4,029,577 | 6/1977 | Godlewski et al. | 252/180 |
| 4,177,245 | 12/1979 | Rosenberg et al. | 423/242 A |
| 4,213,946 | 7/1980 | Furuta et al. | 423/242 A |
| 4,221,769 | 9/1980 | Harper et al. | 423/555 |
| 4,303,568 | 12/1981 | May et al. | 252/181 |
| 4,469,663 | 9/1984 | Crump et al. | 423/555 |
| 4,670,236 | 6/1987 | Thomas et al. | 423/242 |

OTHER PUBLICATIONS

"Improving Scrubber Demister Performance", by W. Ellison, *Power*, Jan. 1979.

*Primary Examiner*—Robert Wax
*Attorney, Agent, or Firm*—John G. Premo; Anthony L. Cupoli; Donald G. Epple

[57] ABSTRACT

A method of preventing scale and deposit formation on the surfaces of mist eliminators in wet scrubber flue gas desulfurization systems which utilize intermittent wash cycles which comprises coating the surfaces of these mist eliminators with a thin coating of talc.

9 Claims, No Drawings

SCALE INHIBITOR FOR INTERMITTENT WASHED MIST ELIMINATORS IN FLUE GAS DESULFURIZATION SYSTEMS

INTRODUCTION

Mist eliminators are an integral part of wet scrubber Flue Gas Desulfurization (FGD) systems. They are used to remove drift or mist from the flue gas as it leaves the scrubber/absorber system. The liquid mist droplets are comprised of reagent recirculating slurry which is usually made of reagent limestone or lime, containing 5 to 15 percent suspended solids. The reagent slurry becomes saturated with calcium sulfate dihydrate, gypsum, and calcium sulfite after reacting with the sulfur dioxide in the flue gas.

When the drift particles are removed from the flue gas stream by the eliminator, the solid phase of the drift tends to be deposited on the mist eliminator chevron baffle slats and the liquid portion gathers into larger droplets and falls back into the slurry tank. This process allows the build up of these solids, and if they remain on the mist eliminator two things may occur. The deposits will harden up as well as will degrade the performance of the mist eliminators.

Performance of the mist eliminator for removing small drift particles is important. If unsatisfactory, solids from carryover will build up inside the down-stream flue gas ducts, on the reheater which will impede heat transfer, or in the bottom of the stack. As deposits build up on the mist eliminators the gap between the slats is decreased, causing a reduced amount of open area for the flue gas to pass through. This will cause an increase in gas velocity which will eventually exceed the design velocity, resulting in smaller particles not impacting the eliminator blades and not being removed. Furthermore, the deposits will plug off the mist eliminator to the point that the induced draft (ID) fan cannot remove the flue gas at the required rate. This causes the system to be shut down for cleaning.

Hardening of the deposits on the mist eliminators is thought to be caused by a number of reasons. These include supersaturated water chemistry in the drift particles with respect to calcium and sulfate; undissolved lime or limestone particles causing localized high concentrations or pH conditions; or carryover of calcium sulfite slurry which slowly oxidizes to a hard gypsum scale.

To prevent these solids from building up on the mist eliminators, almost all scrubbers have mist eliminator wash systems. Most of the mist eliminators are washed intermittently, as opposed to continuously, due to water balance and slurry solids concentration requirements. Even with the continuous wash systems, deposits often build up. These deposits usually form a hard scale, requiring the system to eventually be shut down for cleaning. Sometimes poor quality wash water is used which only compounds the problem.

The use of gypsum scale inhibitors has been found to be generally effective for the continuously washed mist eliminators.

Success in using threshold gypsum scale inhibitors for intermittently washed mist eliminators, however, has not been observed. With the intermittent wash water, since the scale inhibitor would be applied for a very short time (e.g. 2 minutes per one hour wash cycle), there is a long time between wash cycles when no fresh scale inhibitor is applied. During the no wash spray period, inhibitor would be removed from the deposit via the liquid phase of the drift and fall back into the scrubber where it would be excessively diluted. Since this type of technology was found to be ineffective and many wet scrubbers have intermittent wash systems with acute mist eliminator fouling problems, other approaches needed to be evaluated.

An additional description of mist eliminators in the wet scrubber of flue gas desulfurization is described in the article "Improving Scrubber Demister Performance", by W. Ellison, *Power*, January, 1979.

THE INVENTION

The invention comprises a method of preventing scale and deposit formation on the surfaces of mist eliminators in wet scrubber flue gas desulfurization systems which utilize intermittent wash cycles which comprises coating the surfaces of these mist eliminators with a thin coating of talc. The term talc includes magnesium silicate-based materials sometimes known as talc, steatite, soapstone or saponite.

In a preferred embodiment of the invention, the talc is suspended in an aqueous carrier which has been thickened with a water-soluble thickener. The composition optionally may contain a scale inhibitor.

THE WATER-SOLUBLE THICKENER

The water-soluble thickener may be any water-soluble material, preferably a polymeric material which when added to water causes an increase of the viscosity thereof. Typical of such materials are the water-soluble higher molecular weight polymers of ethylene oxide. These polyoxyethylene glycols should each have a molecular weight of at least 500. In a preferred embodiment, it is desirable to use the higher molecular weight waxy solid forms of polyoxyethylene glycols, which materials are usually in the form of powders which have a wax-like feeling. They generally have a molecular weight of at least 1,000. A typical material which is preferred is sold under the trade name Carbowax 1350 which is a polyoxyethylene glycol having an average molecular weight of 1,350.

Another form of waxy water-soluble polymers are the well-known polyvinyl alcohols which have molecular weights ranging from about 20,000 up to about 300,000. The polyvinyl alcohol may be combined with other polyhydroxy compounds. In a preferred combination, the polyvinyl alcohol is blended with corn syrup in a weight ratio of from 0.1–2 to 1:1. A preferred ratio is 0.64:1.

From the above, it is evident that the preferred thickeners are the water-soluble waxes of the type described above.

Other water-soluble polymers that are capable of thickening waters are acrylamide polymers, both homo and copolymers, the water-soluble acrylic acid copolymers, and the like. Usually polymers of this type have a molecular weight of at least 500,000, preferably 1,000,000 or more.

THE SCALE INHIBITORS (a) The Acrylic Acid Polymers

These optional ingredients are preferably the low molecular weight acrylic acid polymers, e.g. sodium polyacrylates having molecular weights in the range of about 500–50,000. A preferred sodium polyacrylate would have a molecular weight of about 2,000. Another class of scale inhibitors are those described in U.S. Pat. No. 4,029,577 which are copolymers of acrylic acid or methacrylic acid with hydroxy acrylate esters such as hydroxypropyl acrylate or hydroxyethyl acrylate.

Another class of useful scale inhibitors are the well-known phosphonates.

(b) The Phosphonates

Generally any water-soluble phosphonate may be used that is capable of providing corrosion inhibition in alkaline systems. See U.S. Pat. No. 4,303,568 which lists a number of representative phosphonates. The disclosure is incorporated herein by reference.

The organo-phosphonic acid compounds are those having a carbon to phosphorus bond, i.e.,

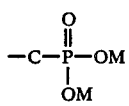

Compounds within the scope of the above description generally are included in one of perhaps 3 categories which are respectively expressed by the following general formulas:

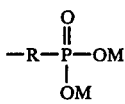

where R is lower alkyl having from about one to six carbon atoms, e.g., methyl, ethyl, butyl, propyl, isopropyl, pentyl, isopentyl and hexyl; substituted lower alkyl of from one to six carbon atoms, e.g., hydroxyl and amino-substituted alkyls; a mononuclear aromatic (aryl) radical, e.g., phenyl, benzene, etc., or a substituted mononuclear aromatic compound, e.g., hydroxyl, amino, lower alkyl subsitituted aromatic, e.g., benzyl phosphonic acid; and M is a water-soluble cation, e.g., sodium, potassium, ammonium, lithium, etc. or hydrogen.

Specific examples of compounds which are encompassed by this formula include:

methylphosphonic acid
$CH_3PO_3H_2$
ethylphosphonic acid
$CH_3CH_2PO_3H_2$
2-hydroxyethylphosphonic acid

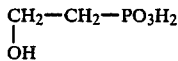

2-amino-ethylphosphonic acid

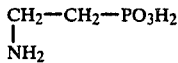

isopropylphosphonic acid

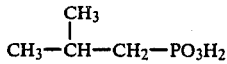

benzene phosphonic acid
$C_6H_5-PO_3H_2$
benzylphosphonic acid
$C_6H_5CH_2PO_3H_2$

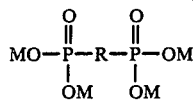

wherein $R_1$ is an alkylene having from about one to about 12 carbon atoms or a substituted alkylene having from about 1 to about 12 carbon atoms, e.g., hydroxyl, amino etc. substituted alkylenes, and M is as earlier defined above.

Specific exemplary compounds and their respective formulas which are encompassed by the above formula are as follows:

methylene diphosphonic acid $H_2O_3P-CH_2-PO_3H_2$ ethylidene diphosphonic acid $H_2O_3P-CH(CH_3)PO_3H_2$ isopropylidene diphosphonic acid $(CH_3)_2C(PO_3H_2)_2$ 1-hydroxy, ethylidene diphosphonic acid (HEDP)

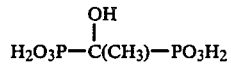

hexamethylene diphosphonic acid $H_2O_3P-CH_2(CH_2)_4CH_2-PO_3H_2$ trimethylene diphosphonic acid $H_2O_3P-(CH_2)_3-PO_3H_2$ decamethylene diphosphonic acid $H_2O_3P-(CH_2)_{10}-PO_3H_2$ 1-hydroxy, propylidene diphosphonic acid $H_2O_3PC(OH)CH_2(CH_3)PO_3H_2$ 1,6-dihydroxy, 1,6-dimethyl, hexamethylene diphosphonic acid $H_2O_3PC(CH_3)(OH)(CH_2)_4C(CH_3)(OH)PO_3H_2$ dihydroxy, diethyl ethylene diphosphonic acid $H_2O_3PC(OH)(C_2H_5)C(OH)(C_2H_5)PO_3H_2$

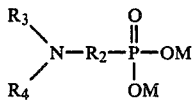

where $R_2$ is a lower alkylene having from about one to about four carbon atoms, or an amine or hydroxy substituted lower alkylene; $R_3$ is [$R_2-PO_3M_2$] H, OH, amino, substituted amino, an alkyl having from one to six carbon atoms, a substituted alkyl of from one to six carbon atoms (e.g., OH, $NH_2$ substituted) a mononuclear aromatic radical and a substituted mononuclear aromatic radical (e.g., OH, NH$_2$ substituted); R$_4$ is R$_3$ or the group represented by the formula

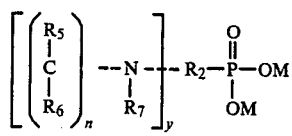

where R$_5$ and R$_6$ are each hydrogen, lower alkyl of from about one to six carbon atoms, a substituted lower alkyl (e.g., OH, NH$_2$ substituted), hydrogen, hydroxyl, amino group, substituted amino group, a mononuclear aromatic radical, and a substituted mononuclear aromatic radical (e.g., OH and amine substituted); R is R$_5$, R$_6$, or the group R$_2$—PO$_3$M$_2$ (R$_2$ is as defined above); n is a number of from 1 through about 15; y is a number of from about 1 through about 14; and M is as earlier defined.

Compounds or formulas therefore which can be considered exemplary for the above formulas are as follows:

nitrilo-tri(methylene phosphonic acid)

N(CH$_2$PO$_3$H$_2$)$_3$ imino-di(methylene phosphonic acid)

NH(CH$_2$PO$_3$H$_2$)$_2$ n-butyl-amino-di(methyl phosphonic acid)

C$_4$H$_9$N(CH$_2$PO$_3$H$_2$)$_2$ decyl-amino-di(methyl phosphonic acid)

C$_{10}$H$_{21}$N(CH$_2$PO$_3$H$_2$)$_2$ trisodium-pentadecyl-amino-di-methyl phosphate C$_{15}$H$_{31}$N(CH$_2$PO$_3$HNa)(CH$_2$PO$_3$Na$_2$)

n-butyl-amino-di(ethyl phosphonic acid)

C$_4$H$_9$N(CH$_2$CH$_2$PO$_3$H$_2$)$_2$ tetrasodium-n-butyl-amino-di(methyl phosphate)

C$_4$H$_9$N(CH$_2$PO$_3$Na$_2$)$_2$ triammonium tetradecyl-amino-di(methyl phosphate)

C$_{14}$H$_{29}$N(CH$_2$PO$_3$(NH$_4$)$_2$)CH$_2$PO$_3$HNH$_4$ phenyl-amino-di(methyl phosphonic acid)

C$_6$H$_5$N(CH$_2$PO$_3$H$_2$)$_2$ 4-hydroxy-phenyl-amino-di(methyl phosphonic acid)

HOC$_6$H$_4$N(CH$_2$PO$_3$H$_2$)$_2$ phenyl propyl amino-di(methyl phosphonic acid)

C$_6$H$_5$(CH$_2$)$_3$N(CH$_2$PO$_3$H$_2$)$_2$ tetrasodium phenyl ethyl amino-di(methyl phosphonic acid)

C$_6$H$_5$(CH$_2$)$_2$N(CH$_2$PO$_3$Na$_2$)$_2$ ethylene diamine tetra(methyl phosphonic acid)

(H$_2$O$_3$PCH$_2$)$_2$N(CH$_2$)$_2$N(CH$_2$PO$_3$H$_2$)$_2$ trimethylene diamine tetra(methyl phosphonic acid)

(H$_2$O$_3$PCH$_2$)$_2$N(CH$_2$)$_3$N(CH$_2$PO$_3$H$_2$)$_2$ hepta methylene diamine tetra(methyl phosphonic acid)

(H$_2$O$_3$PCH$_2$)$_2$N(CH$_2$)$_7$N(CH$_2$PO$_3$H$_2$)$_2$ decamethylene diamine tetra(methyl phosphonic acid)

(H$_2$O$_3$PCH$_2$)$_2$N(CH$_2$)$_{10}$N(CH$_2$PO$_3$H$_2$)$_2$ tetradecamethylene diamine tetra(methyl phosphonic acid)

(H$_2$O$_3$PCH$_2$)$_2$N(CH$_2$)$_{14}$N(CH$_2$PO$_3$H$_2$)$_2$ ethylene diamine tri(methyl phosphonic acid)

(H$_2$O$_3$PCH$_2$)$_2$N(CH$_2$)$_2$NHCH$_2$PO$_3$H$_2$ ethylene diamine di(methyl phosphonic acid)

H$_2$O$_3$PCH$_2$)$_2$NH(CH$_2$)$_2$NHCH$_2$PO$_3$H$_2$ n-hexyl amine di(methyl phosphonic acid)

C$_6$H$_{13}$N(CH$_2$PO$_3$H$_2$)$_2$ diethylamine triamine penta(methyl phosphonic acid)

(H$_2$O$_3$PCH$_2$)$_2$N(CH$_2$)$_2$N(CH$_2$PO$_3$H$_2$)—(CH$_2$)$_2$N(CH$_2$PO$_3$H$_2$)$_2$ ethanol amine di(methyl phosphonic acid)

HO(CH$_2$)$_2$N(CH$_2$PO$_3$H$_2$)$_2$ n-hexyl-amino(isopropylidene phosphonic acid)methylphosphonic acid

C$_6$H$_{13}$N(C(CH$_3$)$_2$PO$_3$H$_2$)(CH$_2$PO$_3$H$_2$)

trihydroxy methyl, methyl amine di(methyl phosphonic acid (HOCH$_2$)$_3$CN(CH$_2$PO$_3$H$_2$)$_2$ triethylene tetra amine hexa(methyl phosphonic acid)

(H$_2$O$_3$PCH$_2$)$_2$N(CH$_2$)$_2$N(CH$_2$PO$_3$H$_2$)(CH$_2$)$_2$N—(CH$_2$PO$_3$H$_2$)(CH$_2$)$_2$N(CH$_2$PO$_3$H$_2$)$_2$ monoethanol, diethylene triamine tri(methyl phosphonic acid HOCH$_2$CH$_2$N(CH$_2$PO$_3$H$_2$)(CH$_2$)$_2$NH(CH$_2$)$_2$N—(CH$_2$PO$_3$H$_2$)$_2$ chloroethylene amine di(methyl phosphonic acid)

ClCH$_2$CH$_2$N((CH$_2$PO(OH)$_2$)$_2$

The above compounds are included for illustration purposes and are not intended to be a complete listing of the compounds which are operable within the confines of the invention.

Another group are the inorganic phosphates.

THE TALC COATING

The coating is applied so as to furnish generally 1.0–5 mm and preferably 0.1–2 mm. It may be sprayed, brushed or rolled. Spraying is preferred. When combined with the water soluble thickener, the product should have the general consistency of house paint.

EVALUATION OF THE INVENTION

A laboratory model of a mist eliminator was constructed. It consisted of a small clear plastic tube. Positioned near the top was an electrically heated rod test section. At the bottom was a nozzle capable of producing a mist which was supplied from a reservoir which contained typical makeup found in flue gas desulfurization units. The top of the unit contained a courser spray that would operate as a washer for the unit.

The following compositions were tested:

| (Note to Inventor: Supply ratio of PVA to corn syrup.) | | |
|---|---|---|
| Composition | Ingredients | |
| A. | 80% | Carbowax 1350 (50% solution) |
|  | 20% | Talcum powder |
| B. | ~75% | Carbowax 1350 (50% solution) |
|  | ~20% | Talcum powder |
|  | ~5% | Na polyacrylate, molecular weight 2,000 |
| C. | 80% | PVA - cornsyrup blend* |
|  | 20% | Talcum powder |
| D. | ~75% | PVA - cornsyrup blend* |
|  | ~20% | Talcum powder |
|  | ~5% | Na polyacrylate, molecular weight 2,000 |
| E. | ~75% | Grease & blue dye 50% |
|  | ~20% | Talcum powder |
|  | ~5% | Na polyacrylate, molecular weight 2,000 |
| F. |  | PVA - cornsyrup blend* |
| G. | 3.7% | solution of Na polyacrylate, moleular weight 2,000 |

*Weight ratio of 0.64 to 1.

Using the above compositions, the following results are presented:

| Test # | Composition | Results % Deposit Reduction | |
|---|---|---|---|
| 1 | A | 53 | First group |
| 2 | D | 96 | |
| 3 | blank | 0 | |
| 4 | blank | 0 | |
| 5 | blank | 0 | |
| 6 | E | (−22) | |
| 7 | C | 45 | |
| 8 | B | 81 | Second group |
| 9 | D | 41.8 | pH not adjusted |
| 10 | blank | (−) | |
| 11 | blank | 0 | Third group |
| 12 | blank | 0 | |
| 13 | D | 71.5 | |
| 14 | B | 91.7 | |
| 15 | blank | 0 | Fourth group |
| 16 | F | 13 | |
| 17 | D | 95.8 | |
| 18 | C | 97 | |

Groups 3 and 4 were most reproduceable because heater position and chemistry variables were constrained.

In Group 2, the pH was not adjusted and the heater placement was random.

In Group 1, the heater placement was random.

In summary, Talcum in combination with a sticky type carrier is needed such as the PVA/cornsyrup or the Carbowax solution. The polyacrylate scale inhibitor does not seem to play much of a role in the process, although it may help in severe cases.

Having thus described our invention, we claim:

1. A method of preventing scale and deposit formation on the surfaces of mist eliminators in wet scrubber flue gas desulfurization systems which utilize intermittent wash cycles which comprises coating the surfaces of these mist eliminators with a thin coating of talc.

2. The method of claim 1 where the talc is suspended in an aqueous carrier which has been thickened with a water-soluble thickener.

3. The method of claim 2 where the water soluble thickener is a water-soluble wax.

4. The method of claim 3 where the water-soluble wax is polyoxyethylene glycol wax.

5. The method of claim 3 where the water-soluble wax is polyvinyl alcohol.

6. The method of claim 5 where the polyvinyl alcohol is combined with corn syrup.

7. The method of claim 1 where the mist eliminator is also treated with a scale inhibitor.

8. A composition useful in preventing scale in the mist eliminators of flue gas desulfurization systems comprising

| Ingredients | % by Weight |
|---|---|
| Talc | 5–30 |
| Thickened aqueous carrier | 50–95 |
| Scale inhibitor | 0–10 |

9. The composition of claim 8 where the scale inhibitor is a low molecular weight acrylic acid polymer.

* * * * *